US010346932B2

(12) United States Patent
Ghosh et al.

(10) Patent No.: US 10,346,932 B2
(45) Date of Patent: Jul. 9, 2019

(54) SYSTEM AND METHOD FOR MODELING OF TARGET INFRASTRUCTURE FOR ENERGY MANAGEMENT IN DISTRIBUTED-FACILITIES

(71) Applicant: CARRIER CORPORATION, Jupiter, FL (US)

(72) Inventors: Sudipta Ghosh, Kolkata (IN); Subhasis Mandal, Bangalore (IN); Ravi Meghani, Bangalore (IN); Rohit Srivastava, Electronic (IN)

(73) Assignee: CARRIER CORPORATION, Jupiter, FL (US)

( * ) Notice: Subject to any disclaimer, the term of this patent is extended or adjusted under 35 U.S.C. 154(b) by 1256 days.

(21) Appl. No.: 14/104,439

(22) Filed: Dec. 12, 2013

(65) Prior Publication Data

US 2015/0120073 A1 Apr. 30, 2015

(30) Foreign Application Priority Data

Oct. 30, 2013 (IN) .......................... 4894/CHE/2013

(51) Int. Cl.
*G06Q 50/06* (2012.01)
(52) U.S. Cl.
CPC .................... *G06Q 50/06* (2013.01)
(58) Field of Classification Search
CPC ..................................................... G06Q 50/06
See application file for complete search history.

(56) References Cited

U.S. PATENT DOCUMENTS

| 6,785,592 B1 | 8/2004 | Smith |
| 6,996,508 B1 | 2/2006 | Culp et al. |
| 7,451,017 B2 | 11/2008 | McNally |
| 7,519,485 B2 | 4/2009 | MacGregor |
| 7,778,734 B2 | 8/2010 | Oswald et al. |

(Continued)

FOREIGN PATENT DOCUMENTS

| CN | 201993809 | 9/2011 |
| CN | 105373842 A | 3/2016 |

(Continued)

*Primary Examiner* — Jay Hann
(74) *Attorney, Agent, or Firm* — Cantor Colburn LLP

(57) ABSTRACT

Energy modeling of target infrastructure for energy management in distributed-facilities. In one embodiment, an energy management modeling method including obtaining customer facility information and a customer business type; obtaining energy management industry standard information related to the customer business type; generating a baseline customer knowledge base, based on the obtained energy management industry standard information; obtaining facility historical operational information and operational policy information; generating a first energy operational model using the customer facility information, the baseline customer knowledge base, the facility historical operational information, and the operational policy information; generating a mapping of energy sources to asset systems, using the first energy operational model; generating an optimized energy operational model using the mapping of the energy sources to asset systems, wherein the optimized energy operational model utilizes an objective function of cost, energy consumption, and emission; and providing the optimized energy operational model.

21 Claims, 6 Drawing Sheets

Example distributed-facilities resource management

(56) References Cited

U.S. PATENT DOCUMENTS

| | | |
|---|---|---|
| 7,894,943 B2 | 2/2011 | Sloup et al. |
| 8,457,802 B1 * | 6/2013 | Steven .................. G06Q 10/00 700/295 |
| 8,532,808 B2 | 9/2013 | Drees et al. |
| 8,560,133 B2 | 10/2013 | Venkatakrishnan et al. |
| 8,589,112 B2 | 11/2013 | Tsypin et al. |
| 8,738,334 B2 | 5/2014 | Jiang et al. |
| 8,880,202 B2 | 11/2014 | Francino et al. |
| 8,892,264 B2 * | 11/2014 | Steven .................. G06Q 50/06 700/286 |
| 9,026,261 B2 | 5/2015 | Bukhin et al. |
| 9,098,876 B2 | 8/2015 | Steven et al. |
| 9,135,667 B2 | 9/2015 | Drees et al. |
| 9,152,610 B2 | 10/2015 | Drees et al. |
| 9,171,276 B2 | 10/2015 | Steven et al. |
| 9,244,444 B2 | 1/2016 | Carty et al. |
| 9,261,863 B2 | 2/2016 | Sloop et al. |
| 9,310,403 B2 | 4/2016 | Brackney et al. |
| 9,335,747 B2 | 5/2016 | Steven et al. |
| 9,355,069 B2 | 5/2016 | Elbsat et al. |
| 9,367,825 B2 | 6/2016 | Steven et al. |
| 9,429,923 B2 | 8/2016 | Ward et al. |
| 9,447,983 B2 | 9/2016 | Smith et al. |
| 9,454,173 B2 | 9/2016 | Angerame et al. |
| 9,507,885 B2 | 11/2016 | Yu et al. |
| 9,524,529 B2 | 12/2016 | Sons et al. |
| 9,530,169 B2 | 12/2016 | Strelec et al. |
| 9,690,312 B2 * | 6/2017 | Steven .................. G06Q 50/06 |
| 2011/0231320 A1 * | 9/2011 | Irving .................. G06Q 50/06 705/80 |
| 2012/0232701 A1 | 9/2012 | Carty et al. |
| 2012/0323382 A1 | 12/2012 | Kamel et al. |
| 2013/0261833 A1 * | 10/2013 | Meghani ............... G06Q 50/06 700/297 |
| 2014/0039686 A1 | 2/2014 | Corbin |
| 2014/0156335 A1 | 6/2014 | Hanson et al. |
| 2014/0244057 A1 | 8/2014 | Hamouz et al. |
| 2014/0278165 A1 | 9/2014 | Wenzel et al. |
| 2015/0057820 A1 | 2/2015 | Kefayati et al. |
| 2015/0081384 A1 | 3/2015 | Zeifman |
| 2016/0018835 A1 | 1/2016 | Gaasch et al. |
| 2016/0195288 A1 | 7/2016 | Hamstra |
| 2016/0305678 A1 | 10/2016 | Pavlovski et al. |
| 2017/0288401 A1 | 10/2017 | Hummon et al. |
| 2018/0004173 A1 | 1/2018 | Patel et al. |

FOREIGN PATENT DOCUMENTS

| | | |
|---|---|---|
| EP | 2838018 A1 | 2/2015 |
| WO | 2017142945 A1 | 8/2017 |

* cited by examiner

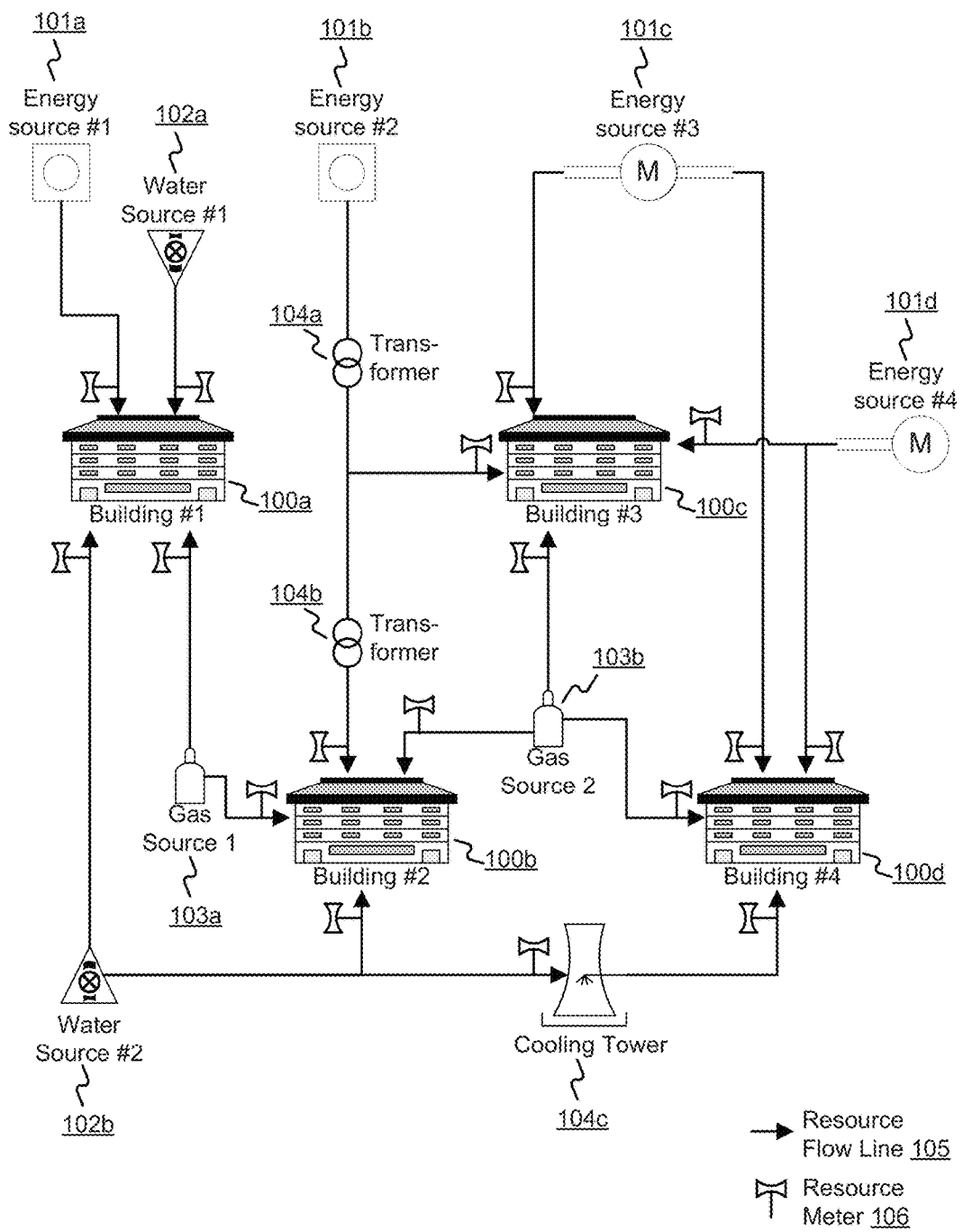
FIG. 1A: Example distributed-facilities resource management

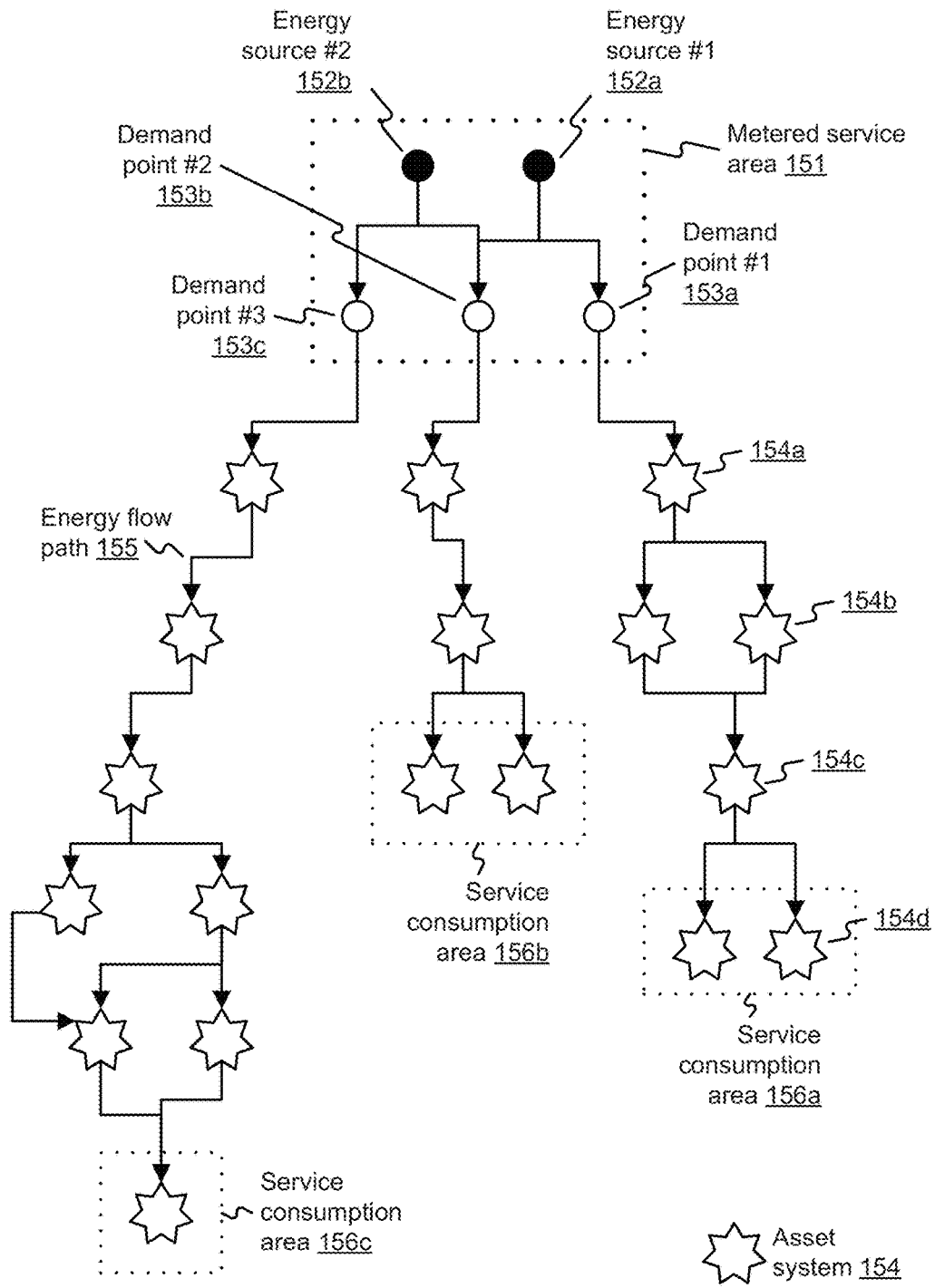
FIG. 1B: Distributed-facilities energy model: source-to-asset mapping

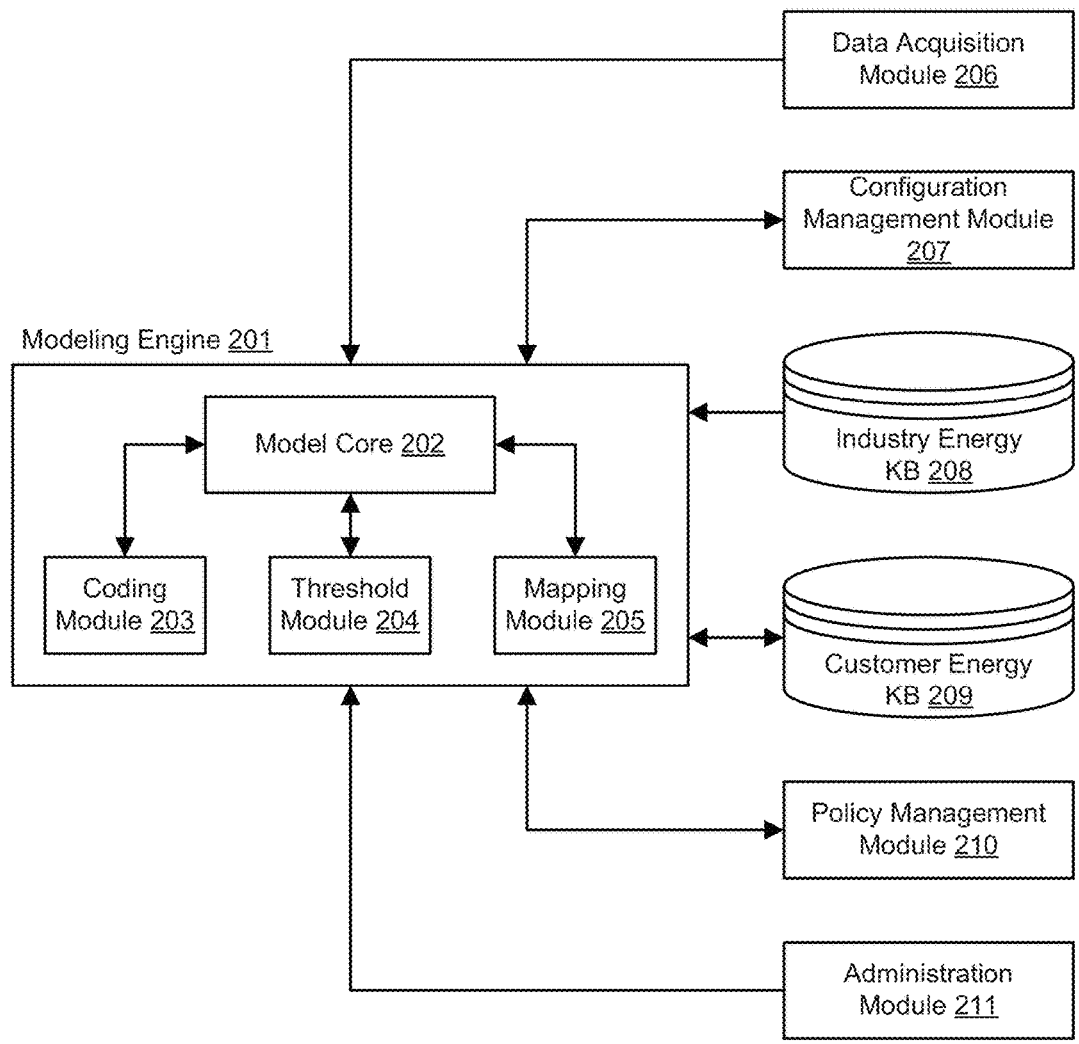
FIG. 2: Example energy management modeling engine components

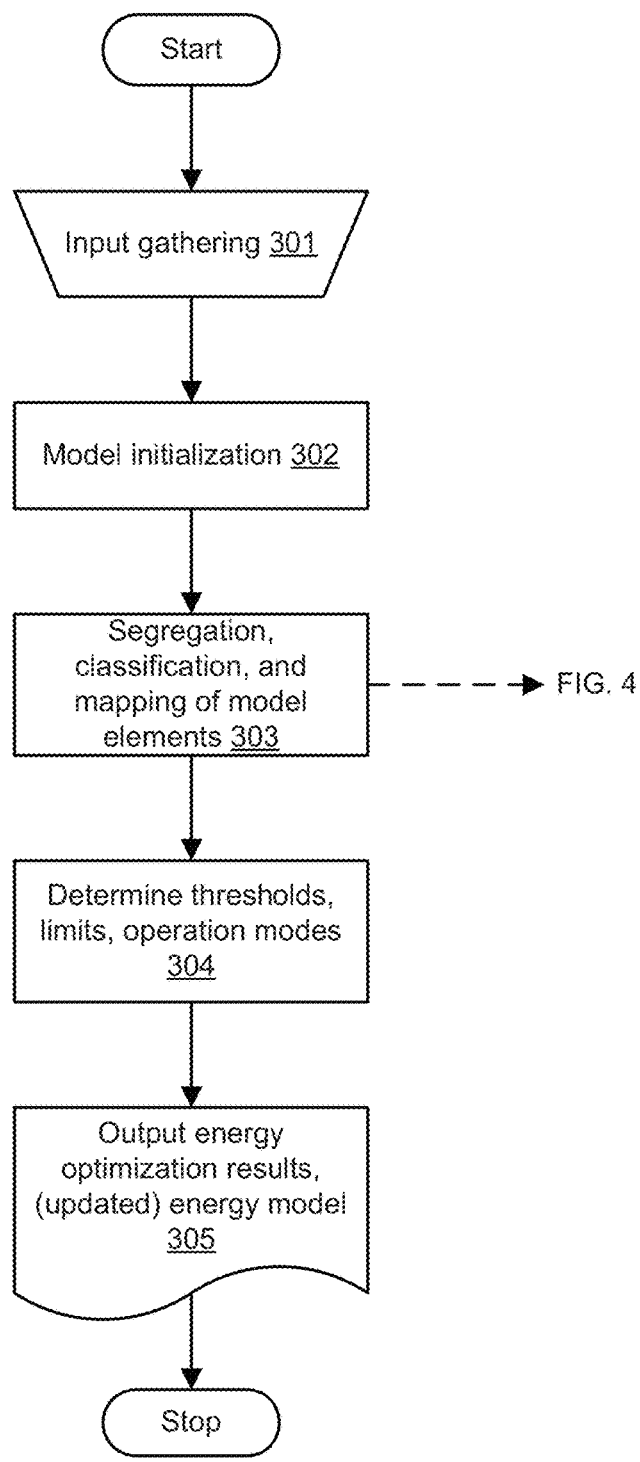
FIG. 3: Example target infrastructure modeling method

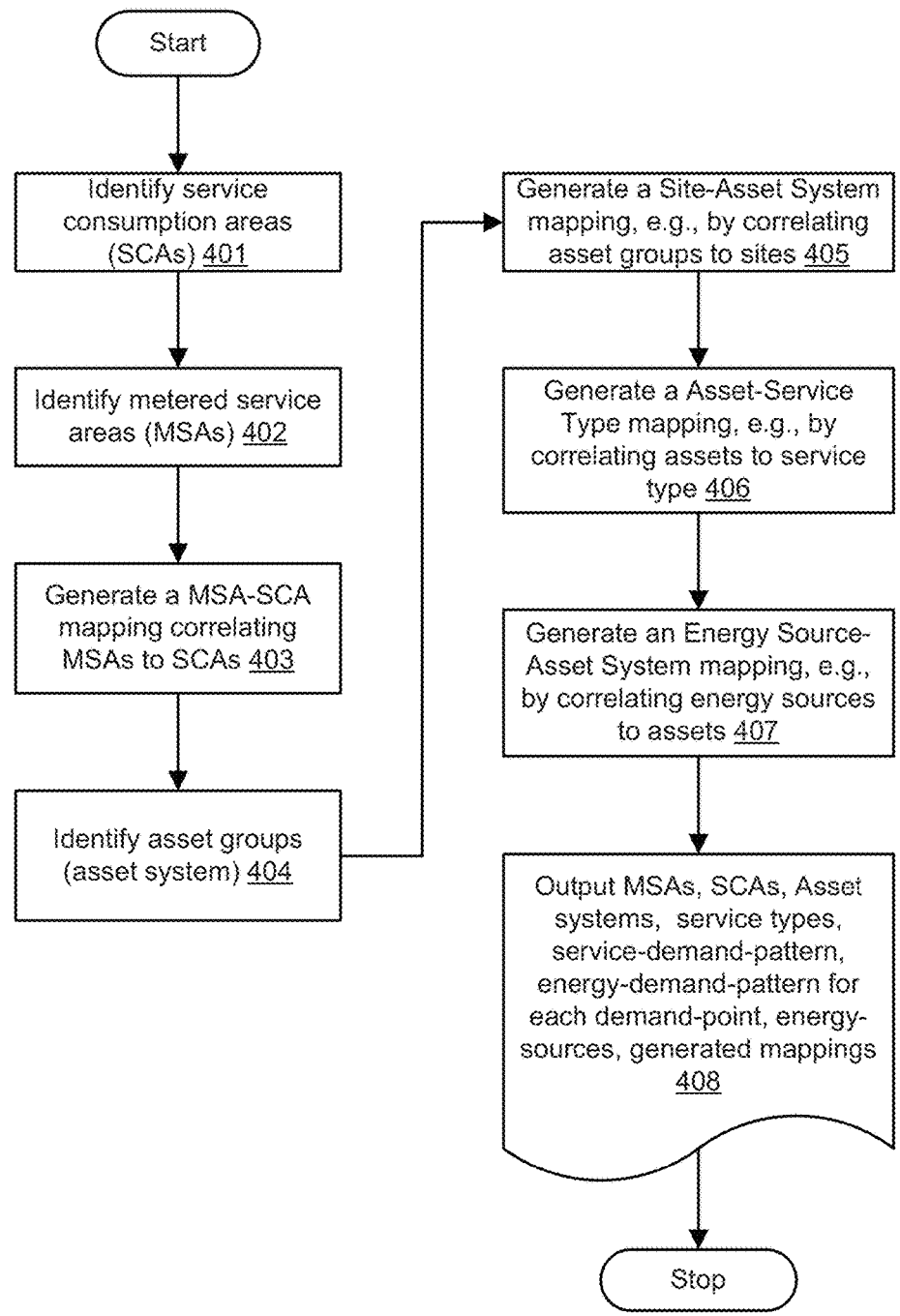
FIG. 4: Example model element segregation, classification, and mapping

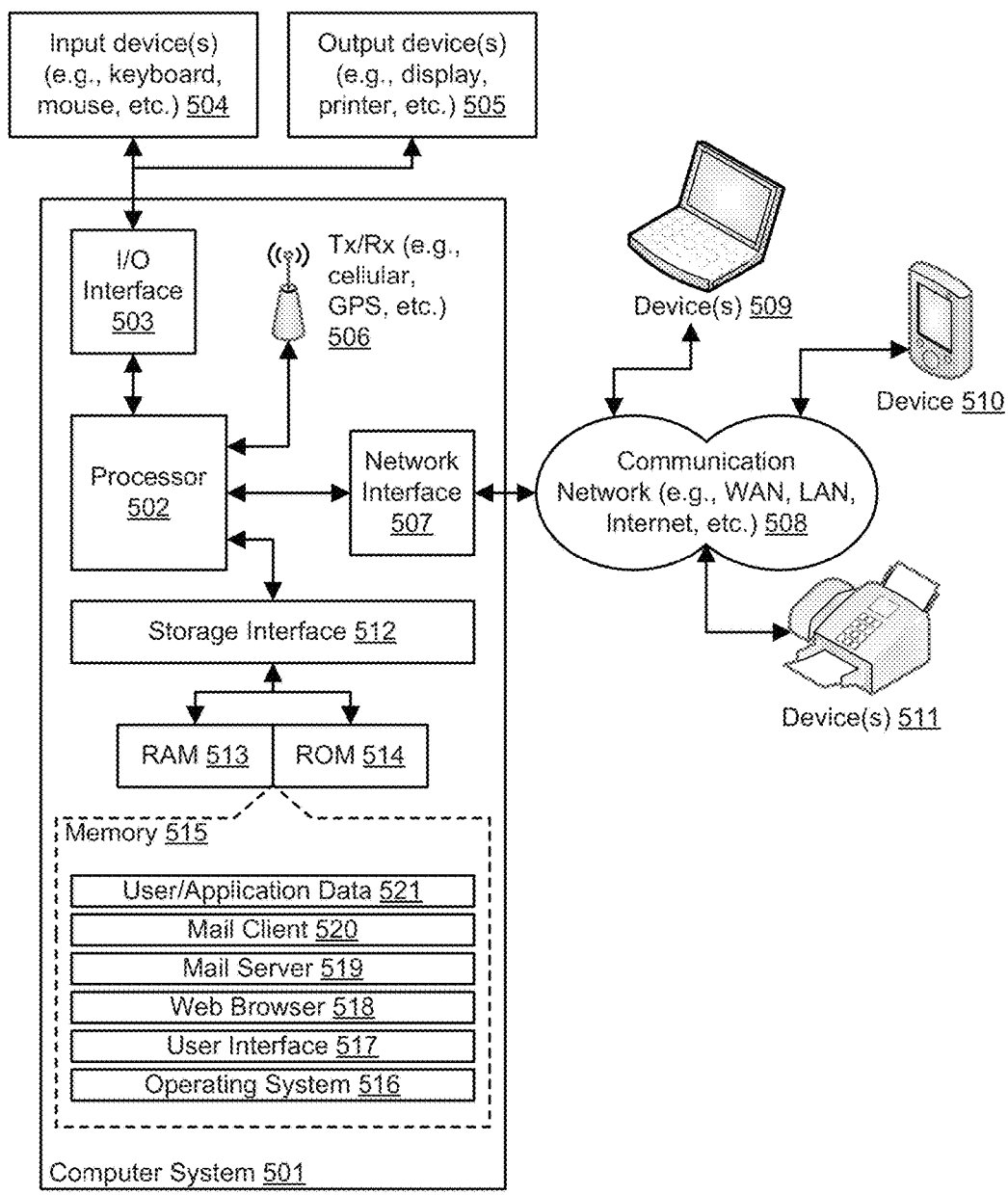
FIG. 5: Exemplary Computer System

SYSTEM AND METHOD FOR MODELING OF TARGET INFRASTRUCTURE FOR ENERGY MANAGEMENT IN DISTRIBUTED-FACILITIES

PRIORITY CLAIM

This U.S. patent application claims priority under 35 U.S.C. § 119 to India Application No. 4894/CHE/2013, filed Oct. 30, 2013, which is incorporated herein by reference in its entirety.

TECHNICAL FIELD

This disclosure relates generally to resource management, and more particularly to a system and method for modeling of target infrastructure for energy management in distributed-facilities.

BACKGROUND

Infrastructure for which resource management is to be performed can be a single site with one or more physical facilities (buildings) or can be a multi-site distributed facility. A facility may be characterized by its space, functions, and policies associated with the facility. Typically, space refers to the dimensions, physical coordinates, rooms, open-space, separators, etc., of the infrastructure. Functions usually refer to the purpose for which a "space" is being used, for example: office, data-center, pantry, etc. Policies may specify the limits and conditions of usage of a space, for example how long a particular temperature should be maintained, when lights must be turned on or off, etc. A spatial model of a target infrastructure may embody these space, function, and policy information.

A facility may also be characterized by the flow of energy from sources of energy to the user-end consumption point (s), and conversion of the energy at different stages. A model of such flows of energy may be referred to as an energy model.

Creation of spatial model and energy model for a target infrastructure for energy management is difficult. It is particularly complicated in the case of a distributed facility with different climate conditions, variation in functional usage, difference in time-zone, diversity of policies, etc.

SUMMARY

In one embodiment, an energy management modeling method is disclosed, comprising: obtaining customer facility information and a customer business type; obtaining energy management industry standard information related to the customer business type; generating a baseline customer knowledge base, based on the obtained energy management industry standard information; obtaining facility historical operational information and operational policy information; generating a first energy operational model using the customer facility information, the baseline customer knowledge base, the facility historical operational information, and the operational policy information; generating a mapping of energy sources to asset systems, using the first energy operational model; generating an optimized energy operational model using the mapping of the energy sources to asset systems, wherein the optimized energy operational model utilizes an objective function of cost, energy consumption, and emission; wherein the optimized energy operational model includes one or more operational parameters or operation thresholds; and providing the optimized energy operational model.

In one embodiment, an energy management modeling system is disclosed, comprising: a processor; and a memory storing processor-executable instructions comprising instructions for: obtaining customer facility information and a customer business type; obtaining energy management industry standard information related to the customer business type; generating a baseline customer knowledge base, based on the obtained energy management industry standard information; obtaining facility historical operational information and operational policy information; generating a first energy operational model using the customer facility information, the baseline customer knowledge base, the facility historical operational information, and the operational policy information; generating a mapping of energy sources to asset systems, using the first energy operational model; generating an optimized energy operational model using the mapping of the energy sources to asset systems, wherein the optimized energy operational model utilizes an objective function of cost, energy consumption, and emission; wherein the optimized energy operational model includes one or more operational parameters or operation thresholds; and providing the optimized energy operational model.

In one embodiment, a non-transitory computer-readable medium is disclosed, storing processor-executable energy management modeling instructions comprising instructions for: obtaining customer facility information and a customer business type; obtaining energy management industry standard information related to the customer business type; generating a baseline customer knowledge base, based on the obtained energy management industry standard information; obtaining facility historical operational information and operational policy information; generating a first energy operational model using the customer facility information, the baseline customer knowledge base, the facility historical operational information, and the operational policy information; generating a mapping of energy sources to asset systems, using the first energy operational model; generating an optimized energy operational model using the mapping of the energy sources to asset systems, wherein the optimized energy operational model utilizes an objective function of cost, energy consumption, and emission; wherein the optimized energy operational model includes one or more operational parameters or operation thresholds; and providing the optimized energy operational model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1A illustrates example aspects of distributed-facilities resource management according to some embodiments of the present disclosure.

FIG. 1B illustrates an example of source-to-asset mapping in some embodiments of distributed-facilities resource management according to the present disclosure.

FIG. 2 is a block diagram of example energy management modeling engine components according to some embodiments of the present disclosure.

FIG. 3 is a flow diagram illustrating an example target infrastructure modeling method in accordance with some embodiments of the present disclosure.

FIG. 4 is a flow diagram illustrating an example model element segregation, classification, and mapping method in accordance with some embodiments of the present disclosure.

FIG. 5 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

This disclosure relates generally to resource management, and more particularly to a system and method for modeling of target infrastructure for energy management in distributed-facilities. Digital models of a target infrastructure created by embodiments of the present disclosure can be used to manage the resource consumption of the target infrastructure. Models created in some embodiments of the present disclosure can dynamically account for changes in energy flow paths, alteration in energy sources, addition and alteration of equipment and devices, or other like changes. For example, if any part of the physical-infrastructure, energy-infrastructure, and/or policies change at any point of time, embodiments of the present disclosure may automatically change the digital model of the facility to reflect these changes. Moreover, some embodiments of the present disclosure may create models and perform energy optimization using the models. Some embodiments of the present disclosure may intelligently propose new and better-suited energy models, with suggested changes, as compared to previously-existing energy models, while accounting for any changes in the infrastructure dynamically.

The embodiments of modeling systems disclosed may be used during an initial modeling phase of the target infrastructure. Further, the modeling system may also be used during steady state of operation of the target infrastructure, or in case of any change in the infrastructure, service specification and policies to incorporate the changes accordingly in the infrastructure model and optimize resource consumption by the target infrastructure.

FIG. 1A illustrates example aspects of distributed-facilities resource management according to some embodiments of the present disclosure. In some embodiments, a facility may be comprised of a plurality of sites. For example, a facility may have four buildings, e.g., Buildings #1-4, 100a-d, as shown in FIG. 1A, located at vastly different locations. The sites may be supplied with various resources. For example, energy sources #1-4 101a-c may provide energy (e.g., electricity) to the buildings. In some scenarios, multiple sources of a resource (e.g., energy, water, gas, air, etc.) may provide the resource to a single site (see, e.g., energy sources #3 and #4 101c-d providing energy to building #3 100c). In some scenarios, a single source of a resource may supply multiple sites within a facility (see, e.g., energy sources #2 101b providing energy to buildings #2 and #3 100b-c). Similarly, water sources (see, e.g., water #1 102a and water source #2 102b) may supply water to one or more sites within the facility. Similarly, gas sources (see, e.g., gas source 1, 103a, and gas source 2, 103b) may supply gas to one or more sites within the facility. In addition, a facility may have intermediate assets, e.g., assets located between sites (see, e.g., transformers 104a-b, cooling tower 104c). In some embodiments, these assets may be grouped in with the assets of a nearest site, or they may be designated as a separate site. The sources in FIG. 1A may be connected to the locations where the resources are utilized via transport systems (e.g., cables, piping, tubing, ducting, etc.), represented in FIG. 1A by resource flow lines 105. In addition, in some embodiments, resource meters 106 (e.g., utilities meter, water flow meters, gas flow meters, etc.) may be installed for measuring the amount of a resource utilized as a site location within the facility.

FIG. 1B illustrates an example of source-to-asset mapping in some embodiments of distributed-facilities resource management according to the present disclosure. In some embodiments, the present disclosure provides a system that may be capable of modeling the interconnectivity between sources of resources, the end assets at which the resources are ultimately utilized, and the interim asset systems and resource flow lines via which the resources are routed to the end assets. For example, the system may be capable of identifying energy sources (e.g., energy source #1, 152a, and energy source #2, 152b), as well as demand points (e.g., demand point #1 153a, demand point #2, 153b, and demand point #3, 153c), that lie within a metered service area (MSA) 151. Accordingly, the system may be able to determine the individual amount of resource being provided by the energy sources, as well as the total metered consumption of the facility. Further, in some embodiments, the system may be capable of identifying energy flow paths 155 of the energy through asset systems 154. Some assets (e.g., refrigerators, air conditioners, heating systems, etc.) may lie within an end-user service consumption area (see, e.g., service consumption areas 156a-b). Other assets may lie along a supply chain from the energy sources to the end-user service consumption area assets (see, e.g., 154a-c).

FIG. 2 is a block diagram of example energy management modeling engine components according to some embodiments of the present disclosure. In some embodiments, an energy management modeling engine may include, without limitation: a modeling engine 201; a model core 202; a coding module 203; a threshold module 204; a mapping module 205; a data acquisition module 206; a configuration management module 207; an industry energy knowledge base 208; a customer energy knowledge base 209; a policy management module 210; and an administration module 211. In some embodiments, each module may be implemented as software instructions capable of being executed by one or more processors. For example, FIG. 5 provides examples of hardware that may execute the instructions comprised within the modules. In alternate embodiments, some of the modules may be implemented as hardware components. FIG. 5 lists numerous specific structures capable of enabling each of the module features discussed herein.

In some embodiments, modeling engine 201 may include a model core 202. The model core may create and maintains digital models of a target facility with the help of other associated modules. In the process of creation and maintenance of the digital model, this module may also perform analysis of existing information to produce intelligent information or suggestions, as discussed further below. In some embodiments, a coding module 203 may maintain and provide globally unique codes (e.g., tags, identifiers, unique numbers, etc.) for each of the operational entities of the modeling engine 201. In some embodiments, a threshold module 204 may perform calculation of thresholds of operational parameters of the target infrastructure. Also, the threshold module 204 may maintain and provides thresholds as and when needed by modeling engine 201. In some embodiments, a mapping module 205 may perform relationship mapping between operational entities of the target infrastructure. Also, maintains and provides relationship information as and when needed by modeling engine 201.

In some embodiments, a data acquisition module 206 may gather information from external sources like an enterprise resource planning (ERP) system, a customer relationship management (CRM) system, a service management (SM) system, etc., as and when needed by the modeling engine 201. In some embodiments, a configuration management module 207 may maintain and provide configuration information (e.g., as provided by a user, administrator, computing system, etc.) as needed by modeling engine 201. Such modules may be implemented, in some embodiments, using I/O interface 503 and/or network interface 507, as discussed further below with reference to FIG. 5. In some embodiments, these modules may also include the input device(s) 504, communication network 508, devices 509, 510, as discussed below with reference to FIG. 5.

In some embodiments, an industry energy knowledge base 208 (IKB) may maintain and provide industry segment-wise benchmark/standard information with regard to energy operations and management. In some embodiments, a customer energy knowledge base 209 (CKB) may maintain and provide information with regard to energy operations and management of the target facility of the customer. These modules may be implemented, in some embodiments, using RAM 513, ROM 514, or other memory 515, as discussed below with reference to FIG. 5.

In some embodiments, a policy management module 210 may maintain and provide information related to energy operations and service specification related policies. In some embodiments, an administration module 211 may enable an authorized user (e.g., a system administrator) to modify different operational parameters of the modeling engine 201. It may also allow an authorized user to make manual alterations to policy, service-specification, model information, etc. Such modules may be implemented as a combination input and storage components, e.g., using a combination of input device(s) 504, I/O interface 503, communication network 508, devices 509-510, and RAM 513, ROM 514, and memory 515, as discussed below with reference to FIG. 5.

FIG. 3 is a flow diagram illustrating an example target infrastructure modeling method in accordance with some embodiments of the present disclosure. In some embodiments, the method may begin with model input gathering, 301, to aggregate customer-specific information for modeling the target infrastructure to enable energy management. The inputs may be aggregated using the data acquisition module 206. Table I below provides a non-limiting example of inputs that may be aggregated.

TABLE I

| Example Modeling Inputs | | |
|---|---|---|
| Inputs | Source | Description |
| Function | ERP | Organization hierarchy information |

TABLE I-continued

| Example Modeling Inputs | | |
|---|---|---|
| Inputs | Source | Description |
| | | (e.g., departments performing different business functions) |
| Location | ERP/SM | Country, location; site information; spatial information |
| Service specification | SM | Service needs and specifications for each site |
| Policies | SM | E.g., limits, operation-schedules, targets, etc. |
| Assets | ERP | Inputs/outputs (e.g., electrical ratings), performance/health information, operating profile (e.g., resource consumption profile/history), maintenance/lifecycle information; Area served (location, building) |
| Load | SM | Service consumption load profile |
| Energy sources | Invoice data/ERP | Details about available energy sources |
| Electricity Flow (line diagram) | Manual input | Energy flow information from source to end-service (front-end supplier-asset) |
| Gas Flow (line diagram) | Manual input | Source and Gas flow information |
| Water Flow (line diagram) | Manual input | Source and Water flow information |
| Air Flow (line diagram) | Manual input | Source and Air flow information |
| Historical Operational Information | SM, CKB, Manual input | Existing operational data |

In some embodiments, using the gathered input, an initial model may be generated, 302. For each gathered input, the industry energy knowledge base 208 may be queried for corresponding industry segment-wise benchmark/standard information with regard to energy operations and management. For example, for an input comprising gas flow line diagrams and/or gas flow information, the industry energy knowledge base 208 may provide industry standards and/or benchmark information related to gas flow lines. The industry-specific benchmark information may include, without limitation, industry-standard operating policies, thresholds, set-points, schedules, industry key performance indicators (KPIs) for processes performed by the target infrastructure, and for the asset systems included in the target infrastructure.

Using the industry standards and/or benchmark information obtained from the industry energy knowledge base 208, the modeling engine 201, using the model core 202 and/or threshold module 204, may generate an initial baseline model CKB0 of the target infrastructure. The modeling engine 201 may provide the initial baseline mode CKB0 for storage in the customer energy knowledge base 209.

In some embodiments, the operating policies, thresholds, set-points, schedules, key performance indicators KPIs (based on historical operational information of the facility) for processes performed by the target infrastructure, and for the asset systems included in the target infrastructure, may be different from the industry standards, as obtained from the industry energy knowledge base 208. The modeling engine 201 may compare, using the model core 202 and/or threshold module 204, the industry-specific benchmark information with the facilities site-specific, equipment-specific, and utility-specific operating policies, thresholds, set-points, schedules, key performance indicators KPIs (based on historical operational information of the facility) for processes performed by the target infrastructure, and for the asset systems included in the target infrastructure. Thus, the modeling engine 201 may generate a modified energy model CKB1, which the modeling engine 201 may provide for storage in the customer energy knowledge base 209.

In some embodiments, the mapping module 205 may perform segregation, classification, and mapping (e.g., with detailed hierarchical ordering) of the model elements in the target facility, using the modified energy model CKB1 and the gathered inputs, to the sources of energy, gas, water, and/or other resources, 303. For example, the mapping module 205 may generate data structures such as, without limitation: linked lists; XML/JSON files, scalar vector graphics (SVG) files, graph database objects, etc., representing the mapping of the model elements in the target facility to the resources. For example, each target facility assets may be represented as nodes within a graph, and each nodes may have associated with it a XML/JSON data structure or other data object including attributes of the node. Further, nodes may within the graph may be interconnected using one or more edges. Each edge may have associated with it a XML/JSON data structure of other data object including attributes of the edge. It is to be understood that the above example graph is exemplary only and non-limiting; any known mechanism for generating and maintaining the model of the target facility may be used instead.

FIG. 4 is a flow diagram illustrating an example model element segregation, classification, and mapping method in accordance with some embodiments of the present disclosure. In some embodiments, the mapping module 205 may identify end-user service consumption areas (SCAs), 401. For example, the modified energy model CKB1 may provide standard definitions, specifications, classifications, thresholds, set-points, operating-schedules, etc. From the location information, building information, and threshold patterns (see, e.g., Table I above), the SCAs may be identified. The mapping module 205 may also identify metered service areas (MSAs), 402, based on building information, tenancy information, energy sources, functional information etc. (see, e.g., Table I above).

The mapping module 205 may generate a MSA-SCA mapping correlating the MSAs (e.g., demand points—see FIG. 1B, 153a-c) for each resource (e.g., electricity, gas, water, air, etc.) to the SCAs at which the end-usage of the resources are performed, 403. The mapping module 205 may, based on the location/building information and SCA type information (see, e.g., Table I above), associate each SCA with one or more specific MSAs.

The mapping module 205 may identify an asset system, e.g., it may identify asset groups among the assets within the target facility, 404. For example, the mapping module 205 may identify the service types based on service specification (see, e.g., Table I above). The mapping module 205 may identify a service required (e.g., using a service-id provided by the coding module 203) for a specific SCA based on the service specification (see, e.g., Table I above) and the SCA information. Using the asset information and location information gathered during the input gathering step (see, e.g., Table I above), and the identified services (service-id) and service types, the mapping module 205 may identify each asset group (asset system) for a specific service (service-id), considering the energy-source information (e.g., the utility information included in the MSA information). For example, the mapping module 205 may begin from an end-user SCA asset, and continue (e.g., upstream towards the source) till the ultimate source has been reached, to identify all asset systems in this supply chain from the MSA(s) to the SCA asset. The mapping module 205 may also classify the assets in the supply chain into supplier assets, control assets and monitor assets while performing this process.

The mapping module 205 may generate a site-asset mapping correlating the asset groups identified at 404 to the sites included within the target facility, 405. For example, the mapping module 205 may group relevant SCAs and associated asset systems and services (e.g., using service-id) with MSAs, according to sites. In some embodiments, the mapping module 205 may group all the MSAs under a single site.

The mapping module 205 may generate an asset service type mapping correlating the asset groups to a particular service type (e.g., air conditioning, water supply, gas supply, electricity supply, etc.), 406, based on the modified energy model CKB1, asset information, service type information, and load information. The mapping module 205 may obtain the type of inputs needed by each from the asset information gathered during the input gathering step (see, e.g., Table I). The asset information, location information and service-id may be used to determine the dependency between supplier assets (e.g., to identify all supplier assets that are in a supply chain to an SCA asset).

As an example, the mapping module 205 may begin with a front-end asset in an SCA, and traverse (e.g., upstream) through the service assets until the last service asset in the service chain has been traversed. For each service asset, the mapping module 205 may identify any necessary back-end-services (e.g., still further service assets required upstream). The mapping module 205 may obtain information about the available back-end-services for the particular location at which the service asset is located. The mapping module 205 may match the service needs for the service asset with the available back-end-services based on the location information of the asset and its service-area (e.g., location, building to which it is providing service). Accordingly, the mapping module 205 may identify the last level of assets in the asset-system. In some embodiments, the modeling engine 201 may provide options for an authorized person (e.g., a system administrator) to adjust the dependency information of service assets based on actual energy-flow information (line-diagram, connectivity, etc.) or physical connectivity.

In some embodiments, the model core 202 may generate an energy source-asset mapping correlating each resource (e.g., from ultimate source, through the demand points), through the entire supply chain encompassing each asset system, up to the assets included in the end-user SCAs, 407. For example, the model core 202 may estimate, or optimize, the energy demand pattern of the each of the assets in the service chains, based on the service demand and policy-specification (e.g., using the gathered inputs, the modified energy model CKB1, and the mappings generated using the mapping module 205). The model core may segregate the asset systems based on energy sources information and demand-point information. The automated method of segregation is based on the supply-side-parameters of the energy sources and consumption-parameters of demand side (asset system side). For example, the mode core 202 may determine which assets should receive their necessary supply from which ultimate resource, and via which service assets. The model core, for this task, may utilize linear programming techniques to optimize: cost, consumption, and emission, of the target facility as a whole. For this purpose, as an example the model core 202 may utilize the following supply-side parameters, for each source, such as:
Supply specifications
Electricity
Frequency
Voltage
Current Reliability factors
Emission factors
Gas
Peak supply
Electricity
Frequency
Voltage
Current
Gas
Consumption restrictions
Time of day—consumption limits
Power factor
Harmonics
Tariff plan
Rates—Consumption
Incentive/penalty As an example the model core 202 may utilize the following demand-side parameters, for each asset, such as:
Capacity need
Peak load
Electricity (KW)
Gas (Liters, KG/second)
Average load
Electricity (KWh)
Gas (Liters, KG/second)
Classified loads/types
Inductive load
Capacitive load
Usual load variations
Electricity (KWh)
Gas (Liters, KG/second)
Inductive load (x %)
Capacitive load (x %)
Redundancy need
Up time (limits)
Switchover time (limits)

The model core 202 and mapping module 205 may output the MSAs, SCAs, Asset systems, service types, service-demand-pattern, energy-demand-pattern for each demand-point, energy-sources, and the generated mappings, 408.

Returning to FIG. 3, in some embodiments, the modeling engine 201, using the model core 202 and/or the threshold module 204, may determine optimized operating policies, thresholds, set-points, schedules, etc., and associated tolerances, for processes performed by the target infrastructure, and for the asset systems included in the target infrastructure, 304. For example, during an initial modeling phase, in absence of historical information, the initial tolerance values/factors can be obtained from the industry energy knowledge base 208 by specifying the customer context information; in the presence of historical information, the initial tolerances values can be derived from the historical data. During steady state, initial tolerances may be obtained from the customer energy knowledge base 209. For example, the model core 202 may provide utility-specific policies for the assets systems within the target facility, such as:
Policy related factors
Source Energy specification (type, combination, consumption limits, performance)
Service specification
Acceptable temp range & environmental factors
Acceptable illumination level
Service demand specification (based on business mode)
Supply-side constraints
Tariff, emission, energy quality, quantity-limits
Operational parameters related to major consumptions
Classification of load
Total load, peak-load
Availability (ex. Redundancy)
Initial tolerance ranges
From industry energy knowledge base 208
Historical data of user (if any, from customer energy knowledge base 209)

The modeling engine 201 may output the energy optimization results (e.g., for controlling the assets within the target facility), and the (updated) energy model, 305.

Computer System

FIG. 5 is a block diagram of an exemplary computer system for implementing embodiments consistent with the present disclosure. Variations or parts of computer system 501 may be used for implementing resource meters 106, asset system 154, modeling engine 201, model core 202, coding module 203, threshold module 204, mapping module 205, data acquisition module 206, configuration management module 207, industry energy knowledge base 208, customer energy knowledge base 209, policy management module 210, and administration module 211. Computer system 501 may comprise a central processing unit ("CPU" or "processor") 502. Processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc., and/or software modules (e.g., in some embodiments, modeling engine 201, model core 202, coding module 203, threshold module 204, mapping module 205, data acquisition module 206, configuration management module 207, policy management module 210, and administration module 211 may be implemented as software modules executed by one or more processors) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described system and method for modeling of target infrastructure for energy management in distributed-facilities. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An energy management modeling method, comprising:
   obtaining customer facility information for a facility and a customer business type;
   obtaining energy management industry standard information related to the customer business type;
   generating a baseline customer knowledge base, based on the obtained energy management industry standard information;
   obtaining facility historical operational information and operational policy information;
   generating a first energy operational model using the customer facility information, the baseline customer knowledge base, the facility historical operational information, and the operational policy information;
   generating a mapping of energy sources to asset systems, using the first energy operational model;
   generating an optimized energy operational model using the mapping of the energy sources to asset systems, wherein the optimized energy operational model utilizes an objective function of cost, energy consumption, and emission;
   wherein the optimized energy operational model includes one or more operational parameters or operation thresholds;
   providing the optimized energy operational model; and
   controlling the asset systems within the facility using the optimized energy operational model;
   wherein generating the mapping of the energy sources to the asset systems further comprises:
   identifying service consumption area assets and metered service areas;
   associating each identified service consumption area asset with one or more of the metered service areas;
   identifying service assets systems associated with the service consumption area assets, based on service types of service assets and location information for the service assets;
   determining location sites for the service assets systems; and
   determining energy flow information for the service asset systems;
   wherein the customer facility information identifies physical transport systems coupling energy sources to service asset systems and physical resource meters measuring an amount of an energy source utilized by a service asset system.

2. The method of claim 1, wherein the customer facility information is associated with a distributed facility.

3. The method of claim 1, wherein the customer facility information includes at least one of: organization functional data; location data; service specification data; operational policy data; facility asset data; service consumption profile data; energy source data; electricity flow data; gas flow data; water flow data; air flow data; or historical operational data.

4. The method of claim 1, further comprising:
   obtaining part of the customer facility information from at least one of:
   a configuration management module configured to obtain customer distributed-facility configuration user data;
   a policy management module configured to obtain at least one of: energy operations, or service specification-related policy data; or
   an administration module configured to enable authorized-user modification of at least one of: customer distributed-facility spatial model data; the operational policy data; or the service specification data.

5. The method of claim 1, further comprising:
   obtaining at least a portion of the energy management industry standard information from an industry energy knowledge base.

6. The method of claim 1, wherein the one or more operational parameters or operation thresholds includes at least one of: an operational policy set-point; a customer location site-specific set-point; an equipment specific set-point; a utility-specific set-point; or an operating schedule.

7. The method of claim 6, further comprising:
   estimating the one or more operational parameters or operation thresholds using the objective function of cost, energy consumption, and emission.

8. An energy management modeling system, comprising:
   a processor; and
   a memory storing processor-executable instructions comprising instructions for:
   obtaining customer facility information for a facility and a customer business type;
   obtaining energy management industry standard information related to the customer business type;
   generating a baseline customer knowledge base, based on the obtained energy management industry standard information;
   obtaining facility historical operational information and operational policy information;
   generating a first energy operational model using the customer facility information, the baseline customer knowledge base, the facility historical operational information, and the operational policy information;
   generating a mapping of energy sources to asset systems, using the first energy operational model;
   generating an optimized energy operational model using the mapping of the energy sources to asset systems, wherein the optimized energy operational model utilizes an objective function of cost, energy consumption, and emission;
   wherein the optimized energy operational model includes one or more operational parameters or operation thresholds;
   providing the optimized energy operational model; and
   controlling the asset systems within the facility using the optimized energy operational model;
   wherein the instructions for generating the mapping of the energy sources to the asset systems further comprise instructions for:

identifying service consumption area assets and metered service areas; associating each identified service consumption area asset with one or more of the metered service areas;

identifying service asset systems associated with the service consumption area assets, based on service types of service assets and location information for the service assets;

determining location sites for the service asset systems; and determining energy flow information for the service asset systems;

wherein the customer facility information identifies physical transport systems coupling energy sources to service asset systems and physical resource meters measuring an amount of an energy source utilized by a service asset system.

9. The system of claim 8, wherein the customer facility information is associated with a distributed facility.

10. The system of claim 8, wherein the customer facility information includes at least one of: organization functional data; location data; service specification data; operational policy data; facility asset data; service consumption profile data; energy source data; electricity flow data; gas flow data; water flow data; air flow data; or historical operational data.

11. The system of claim 8, the memory further storing instructions for: obtaining part of the customer facility information from at least one of:
a configuration management module configured to obtain customer distributed-facility configuration user data;
a policy management module configured to obtain at least one of: energy operations, or service specification-related policy data; or
an administration module configured to enable authorized-user modification of at least one of: customer distributed-facility spatial model data; the operational policy data; or the service specification data.

12. The system of claim 8, the memory further storing instructions for:
obtaining at least a portion of the energy management industry standard information from an industry energy knowledge base.

13. The system of claim 8, wherein the one or more operational parameters or operation thresholds includes at least one of: an operational policy set-point; a customer location site-specific set-point; an equipment specific set-point; a utility-specific set-point; or an operating schedule.

14. The system of claim 13, the memory further storing instructions for:
estimating the one or more operational parameters or operation thresholds using the objective function of cost, energy consumption, and emission.

15. A non-transitory computer-readable medium storing energy management modeling instructions comprising instructions for:
obtaining customer facility information for a facility and a customer business type;
obtaining energy management industry standard information related to the customer business type;
generating a baseline customer knowledge base, based on the obtained energy management industry standard information;
obtaining facility historical operational information and operational policy information;
generating a first energy operational model using the customer facility information, the baseline customer knowledge base, the facility historical operational information, and the operational policy information;
generating a mapping of energy sources to asset systems, using the first energy operational model;
generating an optimized energy operational model using the mapping of the energy sources to asset systems, wherein the optimized energy operational model utilizes an objective function of cost, energy consumption, and emission;
wherein the optimized energy operational model includes one or more operational parameters or operation thresholds; and
providing the optimized energy operational model; and
controlling the asset systems within the facility using the optimized energy operational model;
wherein the instructions for generating the mapping of the energy sources to the asset systems further comprise instructions for:
identifying service consumption area assets and metered service areas; associating each identified service consumption area asset with one or more of the metered service areas;
identifying service assets systems associated with the service consumption area assets, based on service types of service assets and location information for the service assets;
determining location sites for the service asset systems; and
determining energy flow information for the service asset systems;
wherein the customer facility information identifies physical transport systems coupling energy sources to service asset systems and physical resource meters measuring an amount of an energy source utilized by a service asset system.

16. The medium of claim 15, wherein the customer facility information is associated with a distributed facility.

17. The medium of claim 15, wherein the customer facility information includes at least one of: organization functional data; location data; service specification data; operational policy data; facility asset data; service consumption profile data; energy source data; electricity flow data; gas flow data; water flow data; air flow data; or historical operational data.

18. The medium of claim 15, further storing instructions for:
obtaining part of the customer facility information from at least one of:
a configuration management module configured to obtain customer distributed-facility configuration user data;
a policy management module configured to obtain at least one of: energy operations, or service specification-related policy data; or
an administration module configured to enable authorized-user modification of at least one of: customer distributed-facility spatial model data; the operational policy data; or the service specification data.

19. The medium of claim 15, further storing instructions for:
obtaining at least a portion of the energy management industry standard information from an industry energy knowledge base.

20. The medium of claim 15, wherein the one or more operational parameters or operation thresholds includes at least one of: an operational policy set-point; a customer location site-specific set-point; an equipment specific set-point; a utility-specific set-point; or an operating schedule.

21. The medium of claim 20, further storing instructions for:
  estimating the one or more operational parameters or operation thresholds using the objective function of cost, energy consumption, and emission.

* * * * *